United States Patent [19]

Saito

[11] 4,132,194
[45] Jan. 2, 1979

[54] VALVE ARRANGEMENT FOR USE IN MIXTURE RATIO CONTROL SYSTEM OF INTERNAL COMBUSTION ENGINE

[75] Inventor: Masaaki Saito, Yokosuka, Japan
[73] Assignee: Nissan Motor Company, Limited, Japan
[21] Appl. No.: 675,564
[22] Filed: Apr. 9, 1976

[30] Foreign Application Priority Data
May 30, 1975 [JP] Japan .................... 50/73109

[51] Int. Cl.² ............................................. F02B 3/00
[52] U.S. Cl. ............................ 123/32 EA; 251/141; 208/638
[58] Field of Search ........ 123/124 B, 119 EC, 195 A, 123/195 R; 60/276, 285; 137/351, 354, 355; 251/141; 244/164; 74/5.5, 5.7; 248/9, 15, 21, 2

[56] References Cited

U.S. PATENT DOCUMENTS

| 3,112,016 | 11/1963 | Peterson | 248/2 |
| 3,125,313 | 3/1964 | Soderberg | 244/164 |
| 3,128,999 | 4/1964 | Schmidt | 248/9 |
| 3,647,177 | 3/1972 | Lang | 251/141 |
| 3,813,877 | 6/1974 | Hunt | 261/DIG. 74 |
| 3,861,366 | 1/1975 | Masaki et al. | 123/119 EC |
| 3,963,009 | 6/1976 | Mennesson | 123/119 EC |

FOREIGN PATENT DOCUMENTS
762876 12/1956 United Kingdom ................. 251/141

OTHER PUBLICATIONS
Chilton's Foreign Car Repair Manual, vol. I, p. 366 copyright 1971.

Primary Examiner—Charles J. Myhre
Assistant Examiner—R. A. Nelli

[57] ABSTRACT

In an automotive internal combustion engine having an exhaust cleaning catalytic converter in the exhaust system and a mixture ratio control system for controlling the air-to-fuel ratio of combustible mixture toward a predetermined value that will enable the catalytic converter to produce a maximum conversion efficiency, a valve arrangement for use in the mixture ratio control system, comprising a valve unit adapted to control the flow of fluid therethrough either cyclically or continuously and a stationary support member or structure supporting the valve unit and separate from the engine construction so that the valve unit is isolated from the vibrations produced in the engine. The valve arrangement may further comprise resilient bracket means intervening between the valve unit and the support member or structure.

7 Claims, 5 Drawing Figures

VALVE ARRANGEMENT FOR USE IN MIXTURE RATIO CONTROL SYSTEM OF INTERNAL COMBUSTION ENGINE

The present invention relates in general to internal combustion engines of automotive vehicles and, particularly, to a mixture ratio control system for an automotive internal combustion engine of the type using a catalytic converter provided in the exhaust system for exhaust cleaning purposes. More particularly, the present invention relates to a valve arrangement for use in the mixture ratio control system for an internal combustion engine of the specific character.

Some modernized automotive vehicles are equipped with catalytic converters in the exhaust systems of the engines for the purpose of converting toxic air contaminative contents of the engine exhaust gases into harmless compositions before the exhaust gases are discharged into the open air. A typical example of such catalytic converters uses an oxidative catalyst effective to re-oxidize unburned combustible residues of, for example, hydrocarbons (HC) and carbon monoxide in the exhaust gases emitted from the engine cyliners into harmless compounds such as carbon dioxide and water. Experiments conducted with the oxidative catalyst of this nature have revealed that the catalyst is not only reactive to these combustible compounds but is operable to reduce nitric oxides ($NO_x$) in the exhaust gases provided the exhaust gases to be processed by the catalyst are conditioned to contain exhaust compounds in proportions within a certain range which is dictated by the air-to-fuel ratio of the mixture combusted in the engine cylinders. The catalytic converter using an oxidative catalyst thus exhibits triple effects to the exhaust gases of an internal combustion engine and is capable of reducing the different types of air contaminative compounds in a single unit when the combustible mixture supplied to the engine cylinders is proportioned to an air-to-fuel ratio within a certain range. The experiments have further revealed that it is the stoichiometric ratio of about 14.8:1 that enables the triple effect or "three-way" catalytic converter to produce its maximum conversion efficiency against the three kinds of air contaminative compounds in the exhaust gases. It is, for this reason, desirable to have an internal combustion engine of the type using a triple-effect catalytic converter provided with a mixture ratio control system adapted to regulate the air-to-fuel ratio of the mixture to be produced in the mixture supply system of the engine toward the stoichiometric level or maintain the air-to-fuel ratio within a predetermined, relatively narrow range containing such a level.

The mixture ratio control system used in combination with a triple-effect catalytic converter comprises an exhaust sensor operative to detect the concentration of a prescribed type of chemical component contained in the exhaust gases and to produce an analog signal indicative of the detected concentration of the particular component of the exhaust gases. The chemical composition of the exhaust gases is a fairly faithful representation of the air-to-fuel ratio of the mixture produced in the mixture supply system of the engine and, therefore, the mixture ratio control system operating on the basis of the signal thus delivered from the exhaust sensor is capable of accurately and reliably controlling the air-to-fuel ratio of the mixture to be produced in the mixture supply system toward a predetermined value such as the stoichiometric ratio or within a certain range containing such a value. The chemical component to be detected by the exhaust sensor may be oxygen, carbon monoxide or dioxide, hydrocarbons or nitric oxides although oxygen in particular is preferred for ease of detection.

The analog signal produced by the exhaust sensor is fed to an electric control circuit connected to a solenoid-operated valve unit which is arranged to vary the flow of air or fuel to be delivered into the mixture supply system of the engine in accordance with the output signal produced by the control circuit on the basis of the analog signal supplied from the exhaust sensor. The output signal from the control circuit is usually in the form of a train of pulses which are varied in pulsewidth and frequency in such a manner as to eliminate or reduce a difference, if any, between the analog signal produced by the exhaust sensor and a reference signal representative of a predetermined air-to-fuel ratio such as the stoichiometric ratio. The valve unit is thus operated to alternately open and close at a frequency and for durations dictated by the frequency and pulsewidths of the pulses supplied to the unit and controls the flow of air or fuel to be delivered into the mixture supply system in such a manner that the air-to-fuel ratio of the mixture constantly approaches the value represented by the reference signal impressed on the control circuit.

The valve unit is incorporated into an air or fuel delivery circuit in the mixture supply system such as a carburetor or of the fuel injection type and is, thus, usually mounted on any structural part of the carburetor or of the mixture of air delivery system of a fuel injection engine or on any structural part of the engine such as the cylinder block or head. When the engine is in operation, therefore, the valve unit is subjected to vibrations transferred from the engine directly or through the mixture supply system. The valve unit being of a two-position type involving a reciprocating valve body moved back and forth in response to the pulse signals impressed on the valve unit, the mechanical vibrations imparted to the valve unit tend to produce improper motions of the valve body and make the valve unit unable to control the air-to-fuel ratio properly.

An object of the present invention is, therefore, to provide in a mixture ratio control system of the described nature an improved valve arrangement wherein the vibrations transferred from the engine to the valve unit are alleviated to such an extent as will not seriously affect the operation of the valve unit.

Even though the valve unit may be thus isolated or relieved from the vibrations produced in the engine, there still remains a problem that the valve unit is subject to disturbance caused by the shocks and vibrations transferred from the road wheels when the vehicle encounters road irregularities. This also impairs the performance of the valve unit and disables the mixture ratio control system from properly controlling the air-to-fuel ratio.

It is, therefore, another object of the present invention to provide, in a mixture ratio control system of the described nature, an improved valve arrangement wherein the shocks and vibrations transferred from the road wheels of the vehicle are dampened out before they reach the valve unit.

In a conventional valve unit used in a mixture ratio control system, the valve body is arranged to be axially slidable through a tubular guide member into and out of contact with a stationary solenoid core and a valve seat member provided between fluid passageways in the valve unit. When the valve is in operation, the valve body is moved back and forth through the tubular guide member and alternatively abuts to the solenoid core and the valve seat member in cycles which are dictated by the frequency of the pulse signals fed to the valve unit. The valve body is thus subject to friction and impact as it is moved through the guide member and repeatedly strikes upon the solenoid core and valve seat member. The friction and impact thus exerted on the valve body are causative of generation of heat in the valve unit and result in wear of the valve unit. To enable the valve body to move stably through the guide member, furthermore, the valve body and the tubular guide member must be sufficiently elongated. This not only gives rise to increases in the size and weight of the valve unit but adds to the friction between the valve body and the guide member and deteriorates the responsiveness of the valve unit to the signal fed thereto.

Still another object of the present invention is therefore to provide a valve arrangement featuring a valve unit which has substantially no frictional motion.

To accomplish the first described object, the present invention proposes, in an internal combustion engine including a mixture supply system for producing a mixture of air and fuel to be supplied to the engine cylinders, exhaust cleaning means operative to convert at least one prescribed type of air contaminative compound in the exhaust gases from the engine cylinders into harmless compositions and a mixture ratio control system operative to detect the concentration of a prescribed type of chemical component of the exhaust gases and to control the air-to-fuel ratio of the mixture to be produced in the mixture supply system depending upon the detected concentration of the prescribed type of chemical component, a valve arrangement for use in the mixture ratio control system comprising a valve unit operative to control the flow of air or fuel to be delivered into the mixture supply system, and a stationary support member which is separate from the engine construction and which has the valve unit supported thereon. The engine construction herein referred to should be construed to include not only the whole construction of the engine proper but the whole constructions of the mixture supply system and all the engine accessory systems such as the cooling and lubricating systems for the engine.

To accomplish the second described object of the present invention, the valve arrangement further comprises resilient bracket means through which the valve unit is mounted on the above mentioned support member.

The third described object of the invention is accomplished, in the valve arrangement of the above described nature, by the valve unit which comprises a casing structure formed with fluid inlet and outlet ports and a valve chamber intervening between the fluid inlet and outlet ports, a valve seat member projecting in part into the valve chamber and formed with an aperture for providing communication between the fluid inlet and outlet ports through the valve chamber, a solenoid core fixedly mounted within the casing structure and projecting toward the valve seat member, a solenoid coil surrounding the core for magnetizing the core when energized, a valve body movable within the valve chamber between the valve seat member and the solenoid core when the core is magnetized and de-magnetized, the valve body allowing the aperture in the valve seat member to open and establishing the communication between the fluid inlet ports through the aperture and the valve chamber when the valve body is moved toward the solenoid core and closing the aperture and thereby blocking the aforesaid communication when the valve body is moved toward and seated on the valve seat member, and flexible support member supporting the valve body within the valve chamber while allowing the valve body to axially move between the solenoid core and the valve seat member.

The features and advantages of a valve arrangement provided by the present invention will become more apparent from the following description taken in conjunction with the accompnying drawings in which.

Figure 1:
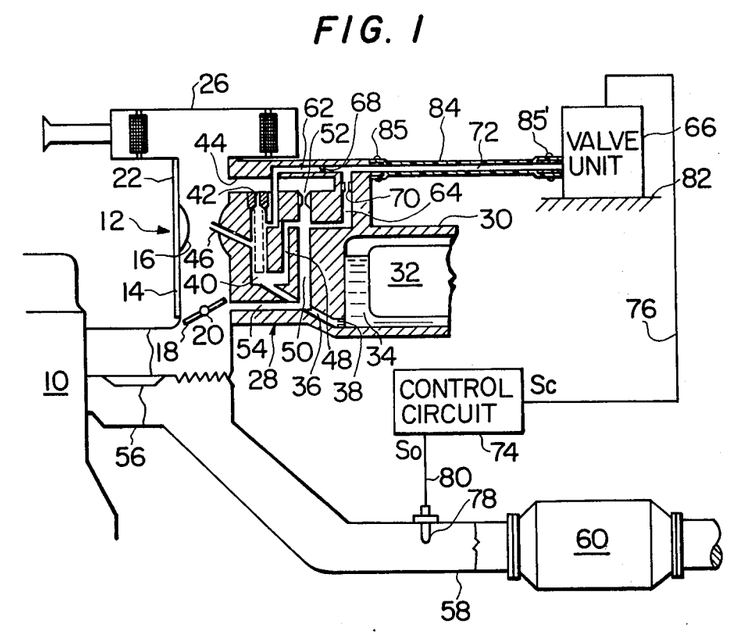
FIG. 1 is a schematic view showing, partly in section, an example of an internal combustion engine including a mixture ratio control system incorporating a preferred embodiment of a valve arrangement according to the present invention.

Reference will now be made to the drawings, first to FIG. 1 which shows an internal combustion engine 10 arranged with a mixture ratio control system incorporating a valve arrangement embodying the the present invention. The engine 10 has a mixture supply system which is shown, by way of example, to be a carburetor 12. The carburetor 12 comprises a mixture delivery pipe 14 having a venturi 16 and a throttle valve 18. The throttle valve 18 is located in the mixture delivery pipe 14 downstream of the venturi 16 and is rotatable with a throttle valve shaft 20. As is well known, the throttle valve shaft 20 is connected to the accelerator pedal by a suitable mechanical linkage so that the throttle valve 18 is driven to rotate with the shaft 20 between a fully closed position as shown and a fully open position through a part throttle position as the accelerator pedal is depressed and released. The mixture delivery pipe 14 is connected between an air horn 22 upstream of the venturi 14 and an intake manifold 24 downstream of the throttle valve 18. The air horn 22 is vented from the open air through an air cleaner 26 and is provided with a choke valve (not shown) to close the air horn during cranking of the engine 10. The intake manifold 24 leads to cylinders (not shown) of the engine through intake ports formed in the cylinder head.

The carburetor 12 has an emulsion block 28 in which are provided main and low-speed fuel delivery circuits. The main fuel delivery circuit originates in a carburetor float bowl 30 having a float 32 positioned therewithin. Though not shown, the float bowl 30 is in communication with a fuel storage tank through a flow control valve operated by the float 32 and has constantly stored therein liquid fuel 34 pumped from the storage tank. The main fuel delivery circuit comprises a main fuel feed passageway 36 leading from the bottom of the float bowl 30 through a main fuel metering jet 38. The fuel feed passageway 36 terminates in a main fuel well 40 having a perforated atomizer tube which is vented from the open air through an air bleed 42 located at the top of the well 40. The air bleed 42 may be directly open to the atmosphere but is preferably in communication with the atmosphere through an air passageway 44 leading from the air horn 22. A main fuel discharge nozzle 46 leads from the main fuel well 40 and opens into the venturi 16. The liquid fuel 34 in the float bowl 30 is thus drawn into the venturi 16 through the main fuel feed passageway 36, main fuel well 40 and main fuel discharge nozzle 46 when the engine is in operation with the carburetor throttle valve 18 in the fully open position or a part throttle position to establish suction in the venturi 16.

On the other hand, the low-speed fuel delivery circuit of the carburetor 12 comprises a low-speed fuel feed passageway 48 branched from the main fuel feed passageway 36. The lowspeed fuel feed passageway 48 leads to a low-speed fuel well 50 which is vented from the open air through an air bleed 52 located at the top of the well 50. The air bleed 52 is shown to be in communication with the atmosphere through the above mentioned air passageway 44 leading from the air horn 22 but may be arranged to be directly open to the atmosphere if desired. The low-speed fuel well 50 leads to a low-speed fuel discharge passageway 54 which has a terminal end open into the mixture delivery pipe 14 slightly dosnstream of the throttle valve 18 in the fully closed position as shown. Though not shown, the low-speed fuel delivery circuit further comprises an idle fuel discharge passageway branched from the above mentioned low-speed fuel discharge passageway 54 and open into the mixture delivery pipe 14 slightly downstream of the open end of the passageway 54.

The general arrangements of the main and low-speed fuel delivery circuits as above described are merely for the purpose of illustration and are, thus, subject to modification and change if desired.

The engine 10 has an exhaust system comprising an exhaust manifold 56 leading from the exhaust ports (not shown) of the individual engine cylinders and an exhaust pipe 58 leading from the exhaust manifold 56. The exhaust pipe 58 is, in turn, connected through a muffler or mufflers to an exhaust tail pipe which is open to the atmosphere at its terminal end, though not shown in the drawing.

The exhaust system is arranged with a catalytic converter 60 which is shown mounted on the exhaust pipe 58 downstream of the exhaust manifold 56. If desired, however, the catalytic converter 60 may be mounted on a converged tube portion of the exhaust manifold 56 immediately upstream of the exhaust pipe 58. The catalystic converter 60 herein shown is assumed to be of the previously described triple-effect or "three-way" type which is concurrently reactive to the three different kinds of air contaminative compounds. viz., hydrocarbons, carbon monoxide and nitric oxides contained in the exhaust gases discharged from the engine cylinders into the exhaust system during operation of the engine 10.

As discussed previously, a triple-effect catalytic converter exhibits a maximum conversion efficiency against the three kinds of air contaminative compounds in the exhaust gases particularly when the air-fuel mixture combusted in the engine cylinders is proportioned to a stoichiometric ratio of about 14.8:1 or within a certain range containing such a ratio. For this reason, the main and low-speed fuel delivery circuits of the carburetor 12 are provided with main and low-speed air-bleed passageways 62 and 64, respectively, which are jointly in communication with a solenoid-operated air-flow control valve unit 66 through restrictions or orifices 68 and 70, respectively, and an air passageway 72.

The valve unit 66 is of a two-position type having a first condition providing communication between the open air and the air passageway 72 and a second condition blocking the communication. For convenience of description, it is herein assumed that the valve unit 66 is arranged to be actuated into the first condition when the valve unit is energized and is brought into the second condition when the valve unit is de-energized, as will be described in more detail. When, thus, the valve unit 66 is energized, the main and low-speed air-bleed passageways 62 and 64 are vented from the open air through the valve unit 66 and the air passageway 72 so that the liquid fuel entering each of the main and low-speed fuel wells 40 and 50 is mixed with not only air admitted into each well through each of the air bleeds 42 and 52 but air which is passed through the valve unit 66 into each of the wells 40 and 50. When, however, the valve unit 66 is deenergized and brought into the second condition thereof, both of the main and low-speed airbleed passageways 62 and 64 are isolated from the open air so that the liquid fuel admitted into each of the main and low-speed fuel wells 40 and 50 is mixed only with air entering each well through each of the air bleeds 42 and 52. A leaner air-fuel mixture is therefore produced in the mixture delivery pipe 14 during the condition in which the valve unit 66 is being energized than during the condition in which the valve unit 66 is de-energized. The air-to-fuel ratio of the mixture produced in the mixture delivery pipe 14 can therefore be controlled by varying the frequency at which the valve unit 66 is actuated to open and close and the durations for which the valve unit 66 is held open and closed. If, thus, the solenoidoperated valve unit 66 is controlled appropriately, then the air-to-fuel ratio of the mixture to be supplied to the engine cylinders can be regulated toward a predetermined level such as a stoichiometric ratio or within a certain range containing such a level. This is achieved by means of an electric control circuit 74 connected by a line 76 to the solenoid-operated valve unit 66.

The control circuit 74 operates on a basic signal $S_o$ which is produced by an exhaust sensor 78 connected by a line 80 to the control circuit 74. The exhaust sensor 78 is located in the exhaust system preferably upstream of the catalytic converter 60 and is operative to monitor the air-to-fuel ratio of the mixture produced in the carburetor 12 through detection of the concentration of a prescribed type of chemical component of the exhaust gases discharged from the engine cylinders into the exhaust system. The exhaust sensor 78 is assumed in the arrangement shown in FIG. 1 to be located in the exhaust pipe 58 upstream of the catalytic converter 60 but, if desired, the same may be located in the converged tube portion of the exhaust manifold 56 upstream of the exhaust pipe 58. If the catalytic converter 60 is mounted on the converged tube portion of the exhaust manifold 56 as previously mentioned, it is preferable that the exhaust sensor 78 be also provided in the particular portion of the exhaust manifold 56 but immediately upstream of the catalytic converter 60 thus arranged. The exhaust sensor 78 is, furthermore, herein assumed by way of example to be of the type adapted to detect the concentration of oxygen contained in the exhaust gases passed therethrough. The output signal $S_o$ of the exhaust sensor 78 is thus assumed to represent the detected concentration the the oxygen content in the exhaust gases discharged from the engine cylinders. If desired, however, the exhaust sensor 78 may be of another type sensitive to any other chemical component of the exhaust gases such as for example hydrocarbons, carbon monoxide, carbon dioxide or nitric oxides or to any combination of two or more of these and/or oxygen..

In operation, the exhaust sensor 78 detects the concentration of oxygen in the exhaust gases passed through the sensor and produces an analog output signal $S_o$ indicative of the detected concentration of oxygen. The output signal $S_o$ thus delivered from the exhaust sensor 78 is usually in the form of voltage that varies continuously with the detected concentration of oxygen.

The analog signal $S_o$ is supplied through the line 80 to the control circuit 74, which then produces a control signal $S_c$ which is in the form of a train of pulses having a frequency and pulseswidths that vary with the basic signal $S_o$ fed to the control circuit 74. The control signal $S_c$ is supplied through the line 76 to the solenoid-operated valve unit 66 and actuates the valve unit 66 between the previously defined first and second conditions thereof in cycles which are dictated by the frequency of the pulses forming the control signal $S_c$. In the shown embodiment in which the catalytic converter 60 is assumed to be of the triple-effect type, the control circuit 74 is assumed to be arranged to cause the valve unit 66 to open and close in such cycles and for such durations that will allow atmospheric air through the valve unit 66 into each of the main and low-speed fuel wells 40 and 50 at such a rate that will produce in the mixture delivery pipe 16 an air-fuel mixture proportioned to an air-to-fuel ratio approximating the stoichiometric ratio. The control circuit having such a function may be easily designed by those skilled in the art and, for this reason, practical circuit arrangements of such a circuit is not herein shown.

In a prior art mixture ratio control system used in combination with the catalytic converter 60, the valve unit 66 is usually mounted on the emulsion block 28 or any other structural part of the carburetor 12, the intake manifold or any other structural part of a mixture or air delivery system (not shown) of a fuel injection type, or any structural part of the engine 10. When the engine 10 is in operation, therefore, vibrations produced in the engine 10 are transferred to the valve unit 66 and tend to cause the valve unit 66 to operate erroneously or improperly. The valve unit 66 is therefore disabled from faithfully responding to the control signal $S_c$ impressed thereon, and, as a consequence, the mixture ratio control system becomes unable to properly control the air-to-fuel ratio of the mixture to be produced in the mixture delivery pipe 16. To prevent this from occurring, the valve unit 66 of the embodiment shown in FIG. 1 is supported on a stationary support member or structure 82 which is separate from the engine construction such as a structural part of the engine 10 or a structural part of the carburetor 12. The valve 66 is thus isolated or relieved from the mechanical vibrations produced in the engine 10 and is therefore capable of operating properly in accordance with the control signal $S_c$ impressed thereon. The support member or structure 82 may be part of a hood ledge panel forming part of the front structure of the vehicle body. The passageway 72 providing the fuel delivery circuits of the carburetor 12 and the valve unit 66 thus positioned separately of the engine construction may be provided by a conduit 84 of preferably a flexible and resilient material such as rubber for minimizing the vibrations that may be transferred from the carburetor 12 to the valve unit 66. Designated by reference numerals 85 and 85' are clips tightening the connections between the conduit 84 and the carburetor emulsion block 28 and the valve unit 66.

Figure 2:
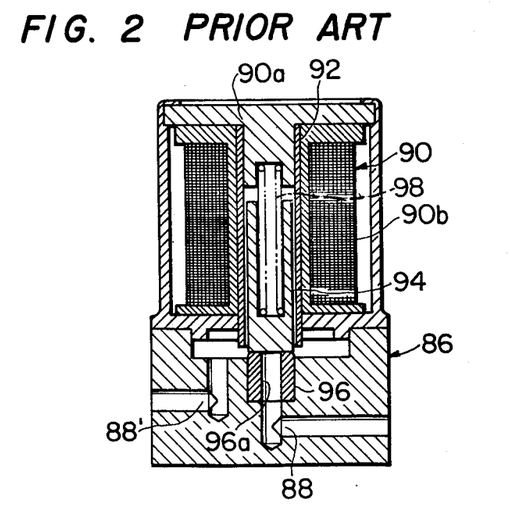
FIG. 2 is a longitudinal sectional view of a representative example of a prior art valve unit for use in a mixture ratio control system of the general character illustrated in FIG. 1.

FIG. 2 illustrates an example of a prior art solenoidoperated valve unit for use in a mixture ratio control system of the character described with reference to FIG. 1. The prior art valve unit comprises a casing structure 86 formed with passageways 88 and 88' and having accommodated therein a solenoid assembly 90, a tubular guide member 92 of a non-magnetic material such as plastics, a cylindrical valve body 94 and a valve seat member 96. The solenoid assembly 90 comprises a stationary solenoid core 90a projecting in part into the bore in the tubular guide member 92 and a solenoid coil 90b surrounding in part the solenoid core 90a through an end portion of the guide member 92. The valve body 94 is axially slidable through the bore in the guide member 92 between a position seated on the the valve seat member 96 as shown and a position spaced apart from the seat member 96 and in contact with the solenoid core 90a. A return spring 98 is provided between the solenoid core 90a and the valve body 94, biasing the valve body 94 toward the position seated on the valve seat member 96. The valve body 94 is moved into the position contacting the solenoid core 90a when the solenoid core 90a is magnetized with the solenoid coil 90b energized by the pulse signal delivered from the previously described control circuit. The valve seat member 96 is formed with an aperture 96a intervening between the passageways 88 and 88' so that communication is provided between the passageways 88 and 88' across the aperture 96a in the seat member 96 when the solenoid coil 90b is energized and the valve body 94 is moved into contact with the solenoid core 90a. When the solenoid core 90a is de-magnetized with the solenoid coil 90b de-energized, the valve body 94 is held by the return spring 98 in the position seated on the valve seat member 96 and closes the aperture 96a therein so that the communication between the passageways 88 and 88' is blocked. One of the passageways 88 and 88' is vented from the open air and the other is in communication with the air-bleed passageways for the main and low-speed fuel delivery circuits of the mixture supply system.

Figure 3:
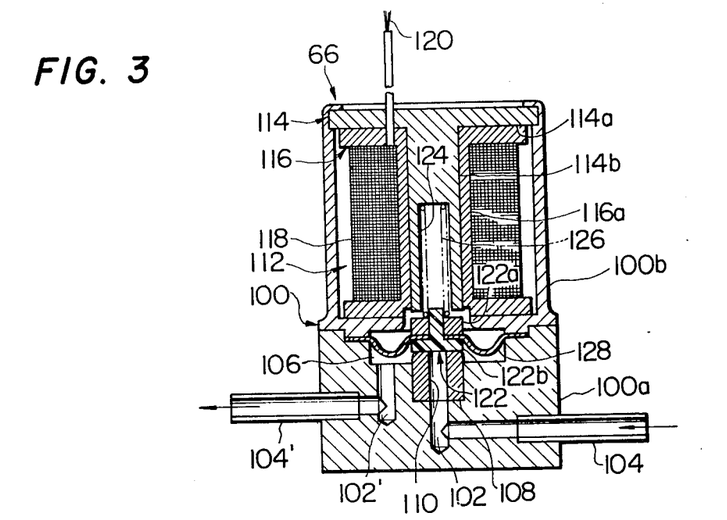
FIG. 3 is a view similar to FIG. 2 but shows a valve unit forming part of the valve arrangement shown in FIG. 1.

When the valve unit thus constructed and arranged is in operation, the solenoid coil 90b is energized and de-energized in cycles dictated by the pulse signal $S_c$ applied thereto so that the valve body 94 is moved back and forth through the tubular guide member 92 into and out of contact with the solenoid core 90a and the valve seat member 96. The valve body 94 is thus subject to friction and impact as it is moved through the guide member 92 and repeatedly strikes upon the solenoid core 90a and the valve seat member 96. The friction and impact thus exerted on the valve 94 tend to cause generation of heat and promotes wear of the valve unit as a whole. In order that, moreover, the valve body 94 be capable of moving stably through the bore in the guide member 92, it is important that the guide member 92 and the valve body 94 be sufficiently elongated to enable the guide member 92 to reliably retain the valve body 94 therein while permitting the valve body 94 to smoothly move therethrough. This not only gives rise to increases in the size and weight of the valve unit but adds to the friction between the valve body 94 and the guide tube 92 and spoils the responsiveness of the valve unit to the control pulse signal with which the solenoid coil 90b is energized. FIG. 3 illustrates a preferred example of the solenoid-operated valve unit eliminating all these drawbacks inherent in the valve unit of the construction illustrated in FIG. 2.

Referring concurrently to FIGS. 1 and 3, the solenoid-operated valve unit shown in FIG. 3 is assumed to be used has a small-sized, light-weight construction which involves air-flow control valve unit 66 of the valve arrangement for the mixture ratio control system illustrated in FIG. 1 and is, for this reason, adapted to control the flow of air to be admitted into each of the main and low-speed fuel delivery circuits of the carburetor 12 through the passageway 72 in the flexible conduit 84 and each of the air-bleed passageways 62 and 64. The valve unit 66 comprises a vertical casing structure 100 consisting of a lower block portion 100a and a hollow, cylindrical upper housing portion 100b secured to the upper end of the lower block portion 100a by suitable fastening means (not shown). The lower block portion 100a is formed with air inlet and outlet ports 102 and 102′ leading from and to air inlet and outlet pipes 104 and 104′, respectively, which project from the block portion 100a. The air inlet pipe 104 is vented from the open air while the air outlet pipe 104′ is connected to the conduit 84 so that the air outlet port 102° is in constant communication with the passageway 72 in the conduit 84 through the pipe 104′. Between the block portion 100a and the housing portion 100b is formed an open space which constitutes a valve chamber 106 intervening between the air inlet and outlet ports 102 and 102′ and having a vertical center axis. The block portion 100a has fixedly received therein a valve seat member 108 which upwardly projects in part into the valve chamber 106 and which is formed a vertical aperture 110 having a lower end open to the air inlet port 102 and an upper end located in the valve chamber 106. The valve seat member 108 has a vertical center axis which is preferably in line with the center axis of the valve chamber 106.

The upper housing portion 100b of the casing structure 100 has fixedly accommodated therein a solenoid assembly 112 positioned over the valve chamber 106 and consisting of a ferromagnetic solenoid core 114, a flanged bobbin 116 of a suitable dielectric and non-magnetic material, and a solenoid coil 118. The solenoid core 114 is composed of a disc portion 114a at its top and a cylindrical portion 114b projecting downwardly from the top disc portion 114a and terminating immediately above the valve chamber 106, the cylindrical portion 114b preferably having a vertical center axis which is substantially in line with the aligned center axes of the valve chamber 106 and the valve seat member 108. The flanged bobbin 116 has a hollow tube portion 116a closely received on the peripheral surface of the cylindrical portion 114b of the solenoid core 114 and has carried on the outer peripheral surface of the tube portion 116a the solenoid coil 118 which is helically wound in substantially concentric relationship to the solenoid core 114. The solenoid coil 118 is grounded at one terminal and connected by a lead 120 to the line 76 connected to the output terminal of the control circuit 74 (FIG. 1).

Within the valve chamber 106 is positioned a valve body 122 vertically movable between an uppermost position in contact with the lower end of the cylindrical portion 114b of the solenoid core 114 and a lowermost position seated on the upper end of the valve seat member 108. With the valve body 122 in the uppermost position contacting the cylindrical portion 114b of the solenoid core 114, the aperture 110 in the valve seat member 108 is open at its upper end to the valve chamber 106 and provides communication between the air inlet and outlet ports 102 and 102′ through the aperture 110 and the valve chamber 106. When the valve body 122 is in the lowermost position seated on the valve seat member 108 as shown, the valve body 122 closes the upper end of the aperture 110 in the valve seat member 108 and thus blocks the communication between the air inlet and outlet ports 102 and 102′. The cylindrical portion 114b of the solenoid core 114 is formed with an axial bore 124 which is open at the lower end of the cylindrical portion 114b and which terminates halfway in the portion 114b. A preloaded helical compression spring 126 is mounted in part within this axial bore 124 and is seated at its lower end on the upper face of the valve body 122, biasing the valve body 122 toward the lowermost position seated on the valve seat member 108 as shown.

The valve body 122 may be constituted by a unitary member of a magnetic material but is preferably composed of two members 122a and 122b constructed of different materials. One member 122a is formed of a magnetic material and has an annular configuration and the other member 122b is formed of a non-magnetic, relatively light-weight material such as plastics and consists of a disc portion adjacent the lower end of the magnetic member 122a and a rod portion projecting upwardly from the disc portion and securely received in the aperture in the annular magnetic member 122a as shown. The magnetic member 122a is engageable at its upper end with the cylindrical portion 114b of the solenoid core 114, while the non-magnetic member 122b is engageable at its lower end with the valve seat member 108. The valve body 122 thus constructed is vertically movably supported within the valve chamber 106 by means of an annular flexible support member 128 having an inner circumferential end secured to the valve body 122 and an outer circumferential end secured to the casing structure 100 in such a manner as to encircle the valve body 122. In the arrangement shown in FIG. 3, the flexible support member 128 has it inner circumferential portion secured between the members 122a and 122b constituting the valve body 122 and its outer circumferential portion secured between the lower block portion 100a and the upper housing portion 100b of the casing structure 100. The support member 128 may be formed of a sheet of flexible, non-magnetic metal, woven or unwoven fabric, rubber, or pliable synthetic resin.

When, in operation, the solenoid coil 118 is energized by the pulse signal $S_c$ supplied from the control circuit 74 (FIG. 1) and accordingly the solenoid core 114 is magnetized, the valve body 122 or, more exactly, the magnetic member 122a of the valve body 122 is attracted toward the solenoid core 114 and is therefore moved into contact with the lower end of the cylindrical portion 114b of the core 114 against the opposing force of the compression spring 126. The valve body 122 or, more exactly, the non-magnetic member 122b of the valve body 122 is consequently unseated from the valve seat member 108 and allows the aperture 110 in the seat member to open at its upper end located in the valve chamber 106. Communication is therefore established between the air inlet and outlet ports 102 and 102' through the aperture 110 in the valve seat member 108 and the valve chamber 106. The valve unit 66 is therefore brought into the previously mentioned first condition thereof allowing atmospheric air to flow through the valve unit 66 and the previously mentioned passageway 72 into the airbleed passageways 62 and 64 for the main and low-speed fuel delivery circuits of the mixture supply system shown in FIG. 1. The valve unit 66 is held in this condition for a duration in which the pulse signal $S_c$ from the control circuit 74 is being impressed on the solenoid coil 118. When the pulse signal $S_c$ then disappears so that the solenoid coil 118 is de-energized, the solenoid core 114 is de-magnetized and allows the valve body 122 to move backwardly into the position seated on the valve seat member 108 by the action of the compression spring 126. The aperture 110 in the valve seat member 108 is now closed by the non-magnetic member 122b of the valve body 122 so that the communication between the air inlet and outlet ports 102 and 102' is blocked. The valve unit 66 is consequently brought into the previously mentioned second condition thereof and interrupts the flow of atmospheric air into the air-bleed passageways 62 and 64 for the main and low-speed fuel delivery circuits (FIG. 1). The valve unit 66 is held in the second condition until the valve unit 66 is for a second time supplied with the signal $S_c$ from the control circuit 72 for a second time. The valve unit 66 is in this fashion actuated alternately between the first and second conditions and controls the air-to-fuel ratio of the mixture in the mixture delivery pipe 16 by regulating the flow of air into the air-bleed passageways 62 and 64 in accordance with the frequency and durations of the pulse signals $S_c$ fed to the solenoid coil 118.

Figure 4:
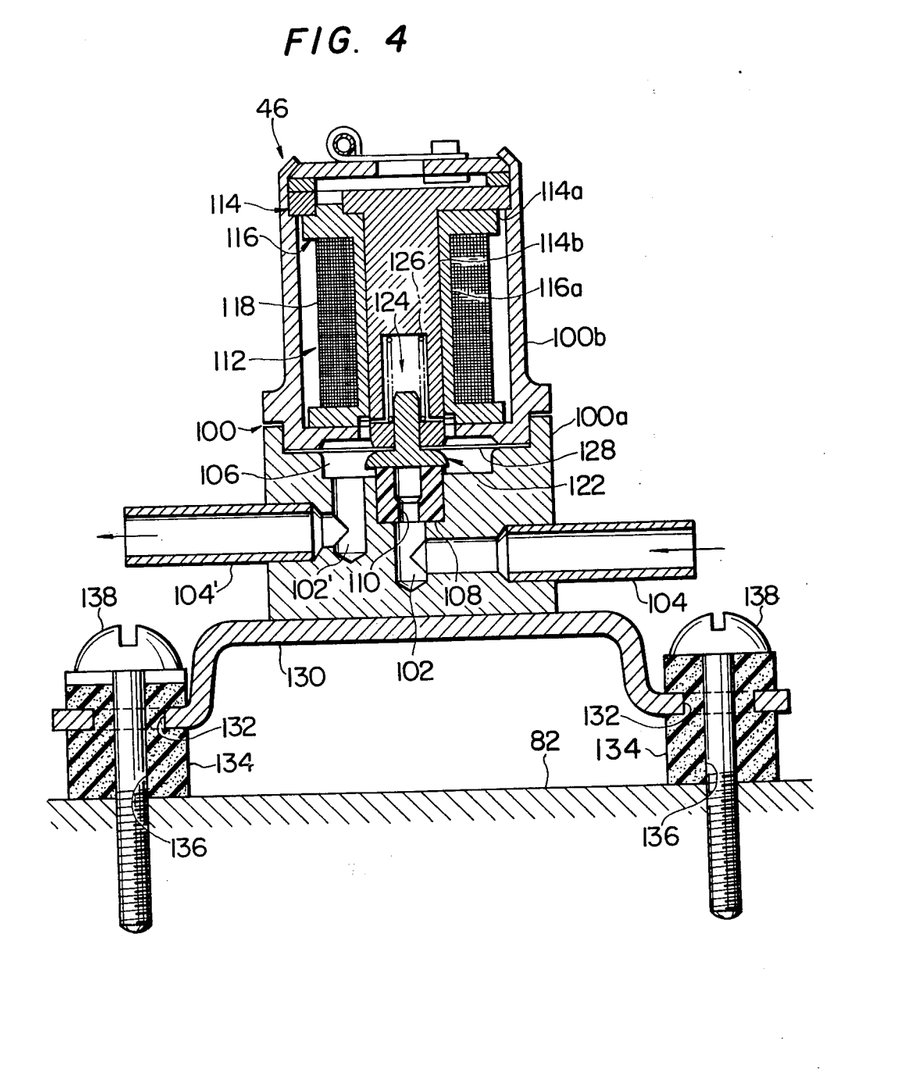
FIG. 4 is a longitudinal sectional view showing another preferred embodiment of the valve arrangement according to the present invention.
Figure 5:
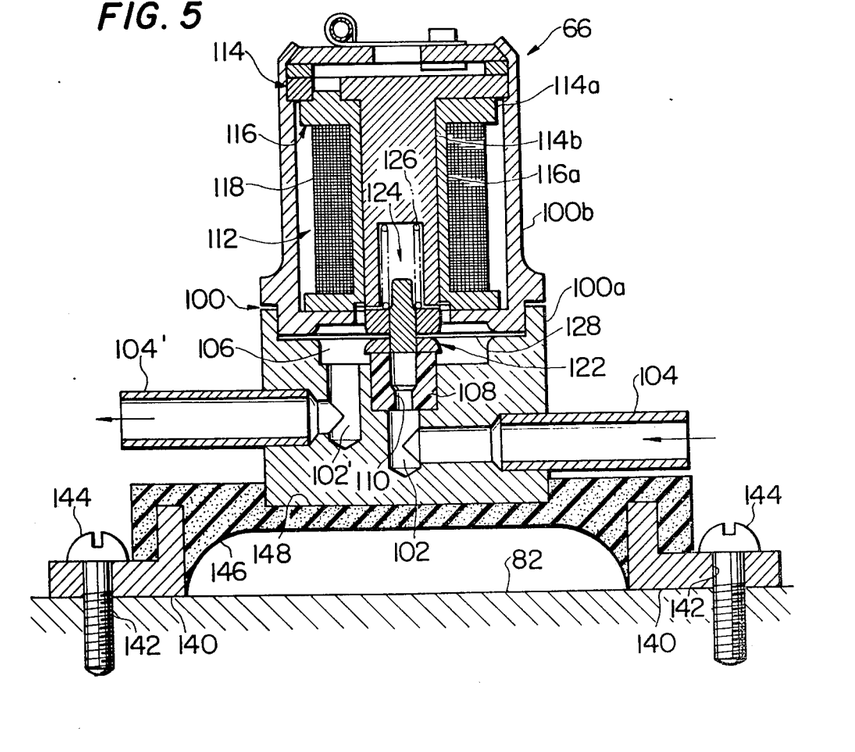
FIG. 5 is a view similar to FIG. 4 but shows a modification of the embodiment illustrated in FIG 4.

The casing structure 100 of the valve unit 66 may be fixedly mounted on the previously mentioned stationary support member or structure 82 forming part of the vehicle body, as shown in FIG. 1. The support member or structure 82 being separate from the engine construction, the valve unit 66 is relieved of the mechanical vibrations produced in the engine 10 so that the valve body 122 is capable of faithfully responding to the pulse signals $S_c$ supplied to the solenoid coil 118. Even though the valve unit 66 may thus be isolated from the vibrations of the engine 10, the valve unit 66 will be subject to external disturbance caused by shocks and vibrations transferred from the road wheels (not shown) through the vehicle body. FIGS. 4 and 5 show embodiments of the valve arrangement in which the valve unit 66 is provided with resilient bracket means between the support member or structure 82 and the casing structure 100 of the valve unit 66 so as to dampen out shocks and vibrations transferred from the vehicle road wheels before they reach the valve unit 66 through the support member or structure 82.

In the valve arrangement shown in FIG. 4, the resilient bracket means comprises a bracket 130 of rigid or, preferably, elastic metal. The bracket 130 is formed with a suitable number of holes 132 and has secured through each of the holes 132 a piece of resilient material 134 formed with a through hole 136 which passes through the hole 132 in the bracket 130. The bracket 130 is horizontally secured to the support member or structure 82 by means of studs or bolts 138 each of which is passed through the hole 136 in each piece of resilient material 134 and screwed or otherwise driven into the support member or structure 82. The valve unit 66 is fixedly mounted on the upper face of the bracket 130 by suitable fastening means (not shown) connecting the casing structure 100 of the valve unit 66 vertically to the bracket 130. The shocks and vibrations transferred to the support member or structure 82 are thus dampened out by the pieces of resilient material 134 and, if the bracket 130 is formed of elastic metal as above mentioned, also by the bracket 130 before the shocks and vibrations reach the valve unit 66.

The resilient bracket means of the valve arrangement shown in FIG. 5 comprises a suitable number of brackets 140 of rigid or, preferably, elastic metal each having an L-shaped section. Each bracket 140 is formed with a hole 142 and is fixedly secured to the upper face of the support member or structure 82 by suitable fastening means such as studs, bolts or screws 144 each of which is screwed or otherwise driven through the hole 142 in each of the brackets 140 into the support member or structure 82. A block 146 of a resilient material is horizontally secured in a suitable manner to the brackets 140 and has fixedly mounted on its upper face the valve unit 66. The block 146 of the resilient material is shown to be formed with a depression 148 which is shaped conformingly to the cross section of the lower block portion 100a of the casing structure 100 of the valve unit 66 and has fixedly received therein a lower end part of the block portion 100a. The resilient material to form the block 146 may be rubber.

While the valve unit mounted on the support member or structure 82 either directly or through the resilient bracket means of the nature described with reference to each of FIGS. 4 and 5 has been assumed to be of the construction illustrated in FIG. 3, the valve unit incorporated in the valve arrangement according to the present invention may be of any other construction such as a solenoid-operated valve unit having a construction similar to or modified from that shown in FIG. 2, a vacuum-responsive diaphragm-operated valve unit or a valve unit using a servo motor.

While, furthermore, the catalytic converter 60 provided in the exhaust system (FIG. 1) has been assumed to be of the tripple-effect type, the valve arrangement according to the present invention may be applied to a mixture ratio control system used in combination with any other type of catalytic converter reactive to only one or two of the previously mentioned three kinds of air contaminative compounds in the exhaust gases. In this instance, the mixture ratio control system should be arranged to control the air-to-fuel ratio toward a value that will enable the catalytic converter to exhibit a maximum conversion efficiency against the one or two kinds of air contaminative compounds.

Although, moreover, the valve unit of the arrangement embodying the present invention has been described to be of the two-position type having a closed condition and a fully open condition, the valve unit incorporated into the valve arrangement according to the present invention may be of a type which is capable of continuously regulating the flow of air or fuel therethrough between zero and a predetermined maximum value.

What is claimed is:

1. In an internal combustion engine including a mixture supply system for producing a mixture of air and fuel to be supplied to the engine cylinders, exhaust cleaning means operative to convert at least one type of air contaminative compound in the exhaust gases from the engine cylinders into harmless composition and a mixture ratio control system operative to detect the concentration of a prescribed type of chemical component of the exhaust gases and control the air-to-fuel ratio of the mixture to be produced in the mixture supply system depending upon the detected concentration of the prescribed type of chemical component, a valve arrangement for use in the mixture ratio control system comprising a valve unit operative to control the flow of air or fuel to be delivered into the mixture supply system, a stationary support member which is mounted separately from the engine, and shock-absorbingly resilient bracket means intervening between said valve unit and said support member for supporting the valve unit on the support member, said valve unit comprising a casing structure supported by said stationary support member through said resilient bracket means and formed with a fluid inlet port for communication with a source of fluid to be supplied to said mixture supply system, a fluid outlet port communicating with the mixture supply system and a valve chamber intervening between the fluid inlet and outlet ports, a stationary valve seat wall located between said valve chamber and one of said fluid inlet and outlet ports and having a center axis therethorough, a solenoid assembly fixedly mounted within said casing structure and including a cylindrical solenoid coil having an axial bore extending throughout the axial length of the coil and having a center axis substantially in line with said center axis of said valve seat wall, said axial bore having one axial end located at a spacing from said valve seat wall across said valve chamber, and a solenoid core having an elongated portion extending in said axial bore throughout the length of the solenoid coil and having a free end located adjacent to said axial end of said bore, a valve body at least in part formed of ferromagnetic metal and axially movable within said valve chamber between said valve seat wall and said free end of said solenoid core, said valve body being constructed separately of said solenoid assembly and being spaced apart from any internal wall portion forming part of said casing structure and bounding part of said valve chamber, biasing means urging said valve body to axially move toward said valve seat wall, and a flexible member supporting said valve body within said valve chamber and holding the valve body laterally apart from said internal wall portion while allowing the valve body to move axially within said valve chamber.

2. A valve arrangement as set forth in claim 1, in which said valve body comprises a magnetic member formed of magnetic metal and engageable with said solenoid core and a non-magnetic member fixed to said magnetic member and engageable with said valve seat member.

3. A valve arrangement as set forth in claim 1, in which said flexible support member is connected to said valve body along the entire circumference of the valve body.

4. A valve arrangement as set forth in claim 1, in which said valve unit is positioned relative to said stationary support member to have said valve body movable vertically.

5. a valve arrangement as set forth in claim 1, in which said shock-absorbingly resilient bracket means comprises a bracket formed with a plurality of holes, pieces of resilient material each secured to said bracket through each of said holes and formed with a through hole passed through the hole in each piece of resilient material, and fastening means securing each of said pieces of resilient material to said stationary support member, said casing structure of said valve unit being fixedly mounted on said bracket.

6. A valve arrangement as set forth in claim 1, in which said resilient bracket means comprises a plurality of brackets, fastening means securing each of said brackets to said stationary support member, and a unitary block of resilient material secured to said brackets and supporting said casing structure of said valve unit thereon.

7. A valve arrangement as set forth in claim 1, in which said stationary support member is constructed by part of a hood ledge panel forming part of the front structure of the vehicle body.

* * * * *